(12) United States Patent
Chang et al.

(10) Patent No.: US 8,210,994 B2
(45) Date of Patent: Jul. 3, 2012

(54) PRESSURE SENSOR AND BOXING MACHINE USING THE SAME

(75) Inventors: Chia-Chieh Chang, Taipei (TW); Chih Sheng Hou, Taipei (TW); Chia-Hung Chou, Taipei County (TW)

(73) Assignee: Universal Cement Corporation, Taipei (TW)

( * ) Notice: Subject to any disclaimer, the term of this patent is extended or adjusted under 35 U.S.C. 154(b) by 0 days.

(21) Appl. No.: 12/651,390

(22) Filed: Dec. 31, 2009

(65) Prior Publication Data

US 2011/0053737 A1   Mar. 3, 2011

Related U.S. Application Data

(60) Provisional application No. 61/238,559, filed on Aug. 31, 2009.

(51) Int. Cl.
*A63B 21/00* (2006.01)

(52) U.S. Cl. ................ 482/83; 428/209; 482/84; 482/5
(58) Field of Classification Search ............. 482/83–90; 428/209

See application file for complete search history.

(56) References Cited

U.S. PATENT DOCUMENTS

| 5,695,859 | A * | 12/1997 | Burgess ........................ 428/209 |
| 6,531,859 | B1  | 3/2003  | Bischoff |
| 6,694,820 | B2  | 2/2004  | Ono |
| 7,034,432 | B1  | 4/2006  | Pelrine et al. |

* cited by examiner

*Primary Examiner* — Jerome w Donnelly
(74) *Attorney, Agent, or Firm* — Lowe Hauptman Ham & Berner LLP (57) ABSTRACT

A pressure sensor is provided, wherein a ballast resistive layer is integrated in the pressure sensor so that the resistive output curve for the pressure sensor has saturation characteristics. The pressure sensor shall be prevented from breaking down by a large current that may be caused, when an overload pressure is applied on the pressure sensor, if no ballast resistive layer is added.

20 Claims, 12 Drawing Sheets

PRESSURE SENSOR AND BOXING MACHINE USING THE SAME

CROSS REFERENCE TO RELATED APPLICATIONS

This application claims priority of Provisional Patent Application Ser. No. 61/238,559, filed on Aug. 31, 2009, the entirety of which is incorporated by reference herein.

BACKGROUND OF THE INVENTION

1. Field of the Invention

This application relates in general to a pressure sensor and in particular to a pressure sensor having a ballast resistive element.

2. Description of the Related Art

Figure 1:
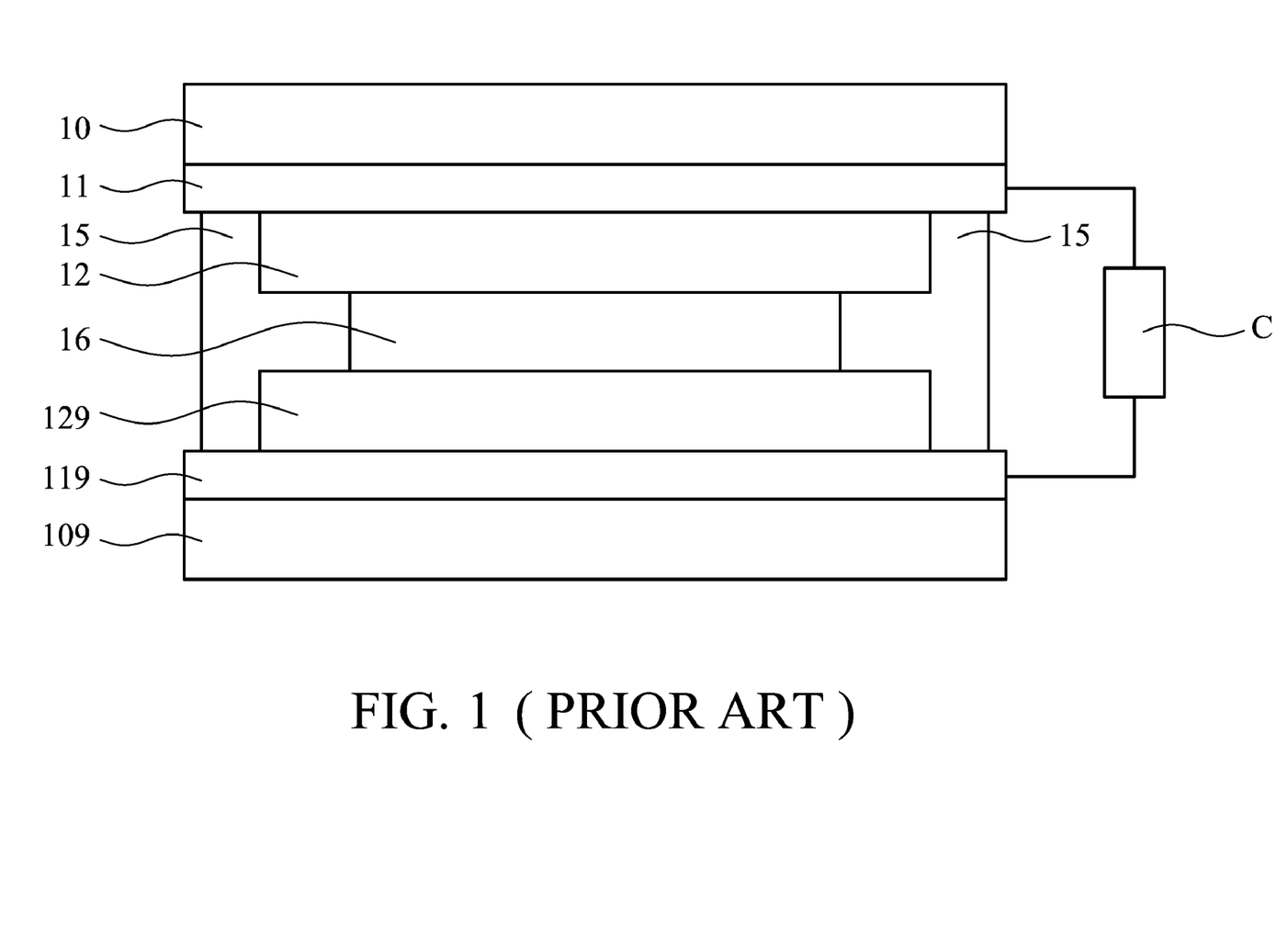
FIGS. 1 and 2 are perspective diagrams of a pressure sensor.

Referring to FIG. 1, a conventional pressure sensor comprises two substrates 10 and 109 disposed on the top and bottom sides therefore. Two metal electrodes 11 and 119 are disposed on the substrates 10 and 109, and two piezoresistive layers 12 and 129 are disposed on the metal electrodes 11 and 119 with a space 16 formed therebetween. Additionally, a spacer 15 is disposed between the substrates 10 and 109, wherein a part of the spacer 15 is extended between the piezoresistive layers 12 and 129 to form the space 16. As shown in FIG. 1, the metal electrodes 11 and 119 are electrically connected to a circuit system C. When no pressure is applied to the pressure sensor, the sensing circuit is open. When a pressure P is applied to the pressure sensor, as shown in FIG. 2, the piezoresistive layers 12 and 129 contact each other and form a closed circuit, thus enabling pressure measurement.

Since the piezoresistive layers 12 and 129 are made of piezoresistive material, they can have small resistance when deformed by external pressures. In the conventional pressure sensor, output resistance of the pressure sensor decreases with the increase of the pressure P.

According to Ohm's law (V=IR), the output resistance of the pressure sensor dominates the output current. Hence, the current I will increase when the voltage V is fixed with the decrease of the pressure P. However, when an overload pressure is applied, the linear pressure sensor may have a very small resistance that results in excessive output current. Thus, the circuit system can be damaged by the current.

Figure 2:
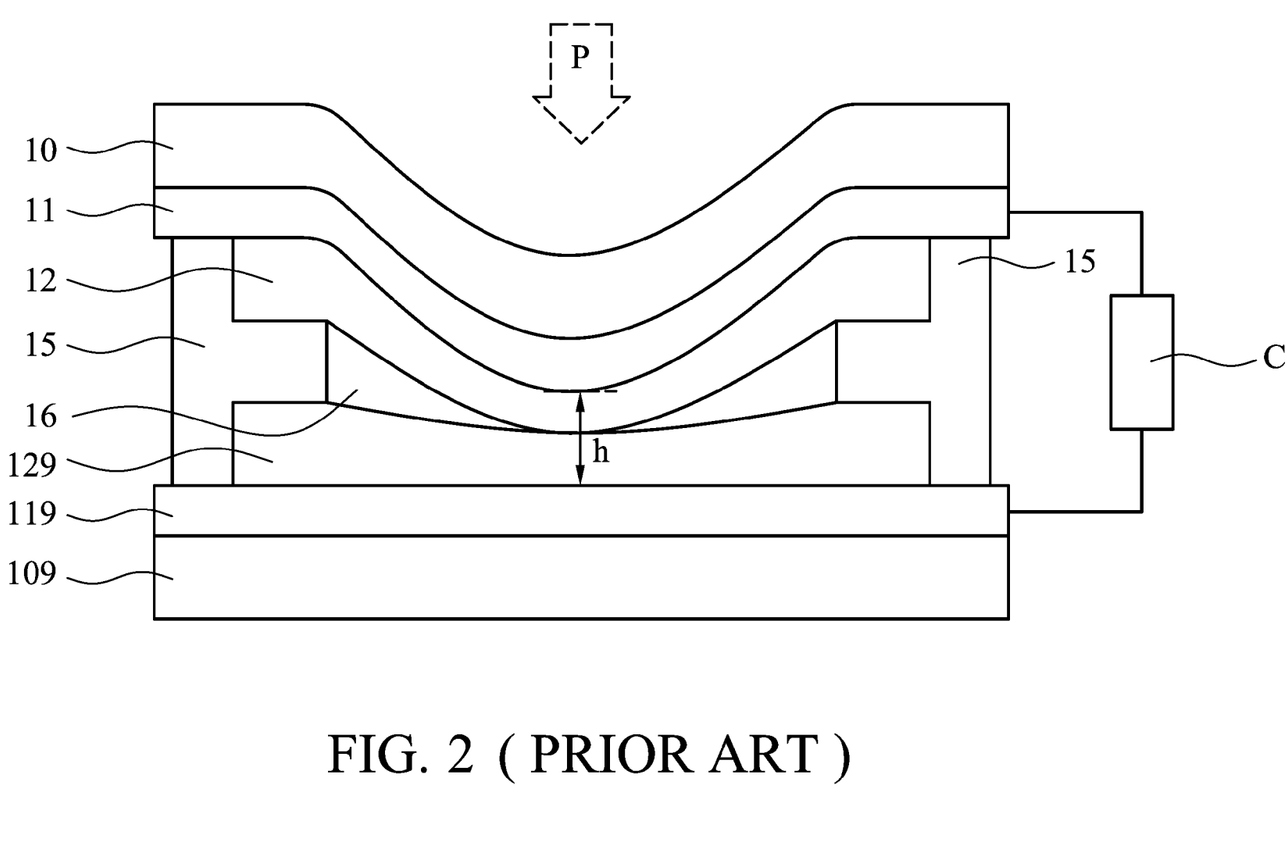

As depicted in FIG. 2, when the pressure P is exerted on the pressure sensor, the substrate 10, the metal electrode 11, and the piezoresistive layer 12 are deformed downwardly, wherein the piezoresistive layers 12 and 129 contact each other. Output resistance of the piezoresistive layers 12 and 129 is determined by the height h thereof.

Resistance output of a piezoresistive sensor can be calculated by the formula R=p*L/A, wherein R is the electrical resistance output of the piezo resistive sensor (measured in ohms, $\Omega$), L is the total thickness of the pressed piezoresistive layers (measured in centimeters, cm), and A is the pressed area applied over the piezoresistive sensor (measured in square centimeters, $cm^2$).

BRIEF SUMMARY OF INVENTION

The application provides a pressure sensor with a ballast resistive layer integrated therein, so that the resistive output curve for the pressure sensor has saturation characteristics. The pressure sensor shall be prevented from breaking down by a large current that may be caused, when an overload pressure is applied on the pressure sensor, if no ballast resistive layer is added.

An embodiment of the application provides a pressure sensor comprising a first ballast resistive layer, a first piezoresistive layer connected to the ballast resistive layer, a second piezoresistive layer, a first electrode layer connected to the second piezoresistive layer, and a spacer disposed between the first and second piezoresistive layers to form a space therebetween. Specifically, the pressure sensor can be applied to a boxing machine for boxing punching. The boxing machine may comprise a boxing target with the pressure sensor disposed thereon and a holder for fixing the boxing target.

BRIEF DESCRIPTION OF DRAWINGS

The invention can be more fully understood by reading the subsequent detailed description and examples with references made to the accompanying drawings, wherein.

DETAILED DESCRIPTION OF INVENTION

As a ballast resistive layer is applied to a piezoresistive pressure sensor, no excessive current shall be output even if an over pressure is applied on the piezoresistive pressure sensor.

Figure 3:
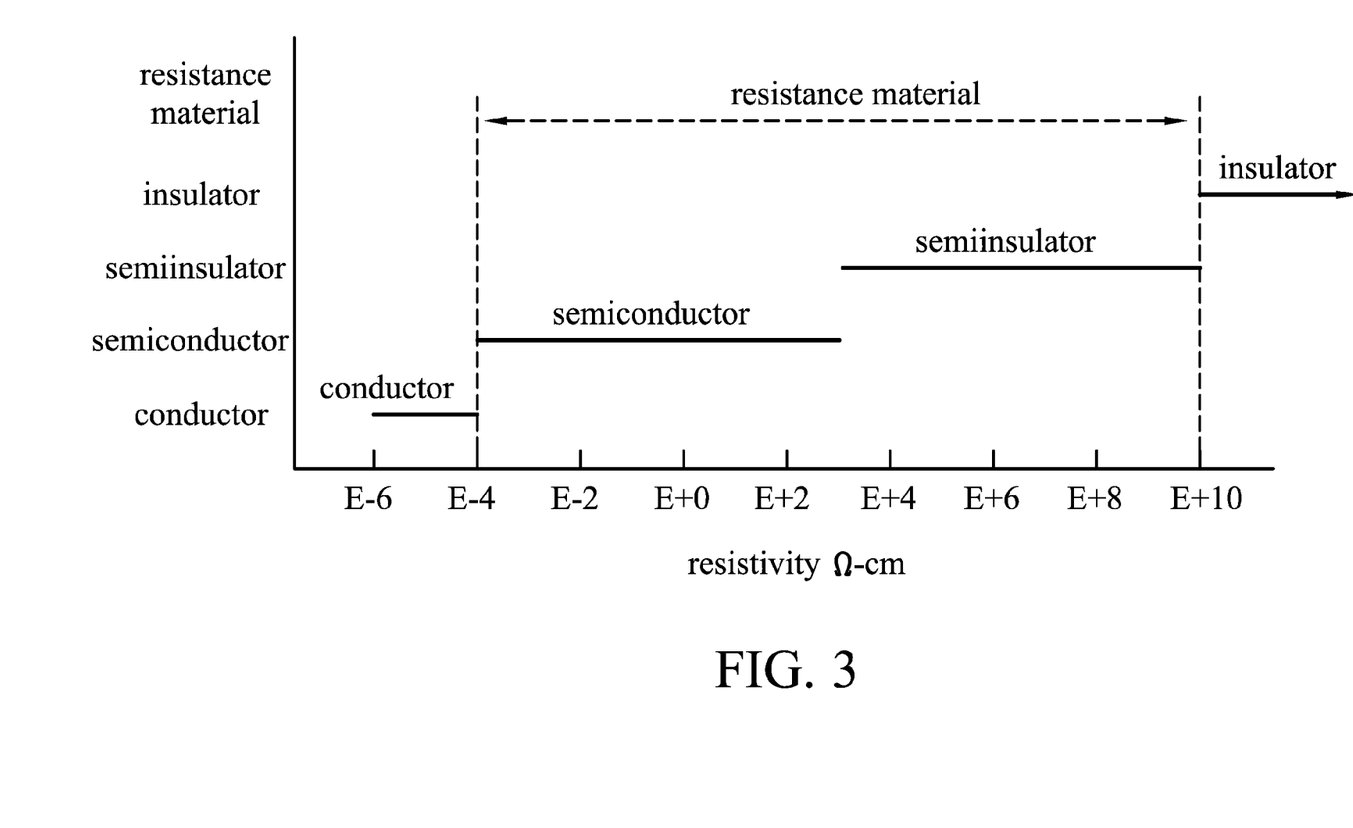
FIG. 3 is a perspective diagram of the resistivities of different materials

Referring to FIG. 3, resistivity of conventional conductive materials, such as metal, is between $10^{-6}$ to $10^{-4}$ $\Omega$-cm. The semiconductor is between $10^{-4}$ to $10^3$ $\Omega$-cm, the semiinsulator is between $10^3$ to $10^{10}$ $\Omega$-cm, and the insulator exceeds $10^{10}$ $\Omega$-cm. As the semiconductor and semiinsulator have a resistivity between $10^{-4}$ to $10^{10}$ $\Omega$-cm, they can be used as resistance materials, such as carbon paste, silver paste, metal oxide, nanoparticle, nanowire, nanosheet, nanorod, nanobelt, or carbon nanotube.

Figure 4:
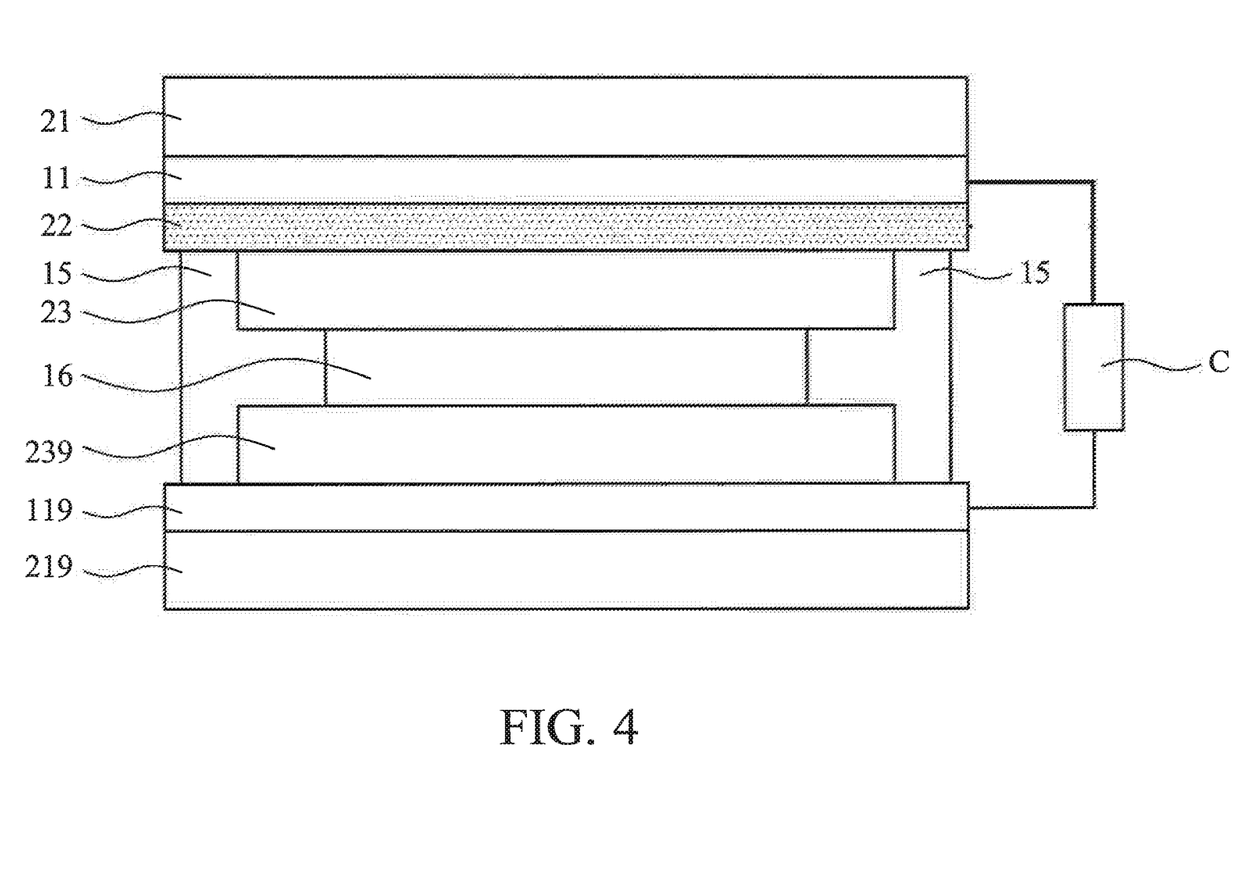
FIG. 4 is a perspective diagram of a pressure sensor according to a first embodiment of the invention.

Referring to FIG. 4, a first embodiment of a pressure sensor comprises two substrates 21 and 219 disposed on the top and bottom sides thereof. Two metal electrodes 11 and 119 are respectively disposed on the substrates 21 and 219. As shown in FIG. 4, a piezoresistive layer 239 is disposed on the metal electrode 219, and a ballast resistive layer 22 is disposed between the electrode 11 and a piezoresistive layer 23, thus forming a sandwich structure. A space 16 is formed between the piezoresistive layers 23 and 239. A spacer 15 is disposed between the substrates 21 and 219, wherein a part of the spacer 15 is extended between the piezoresistive layers 21 and 219 to form the space 16. Furthermore, the metal electrodes 11 and 119 are electrically connected to a circuit system C.

Figure 5:
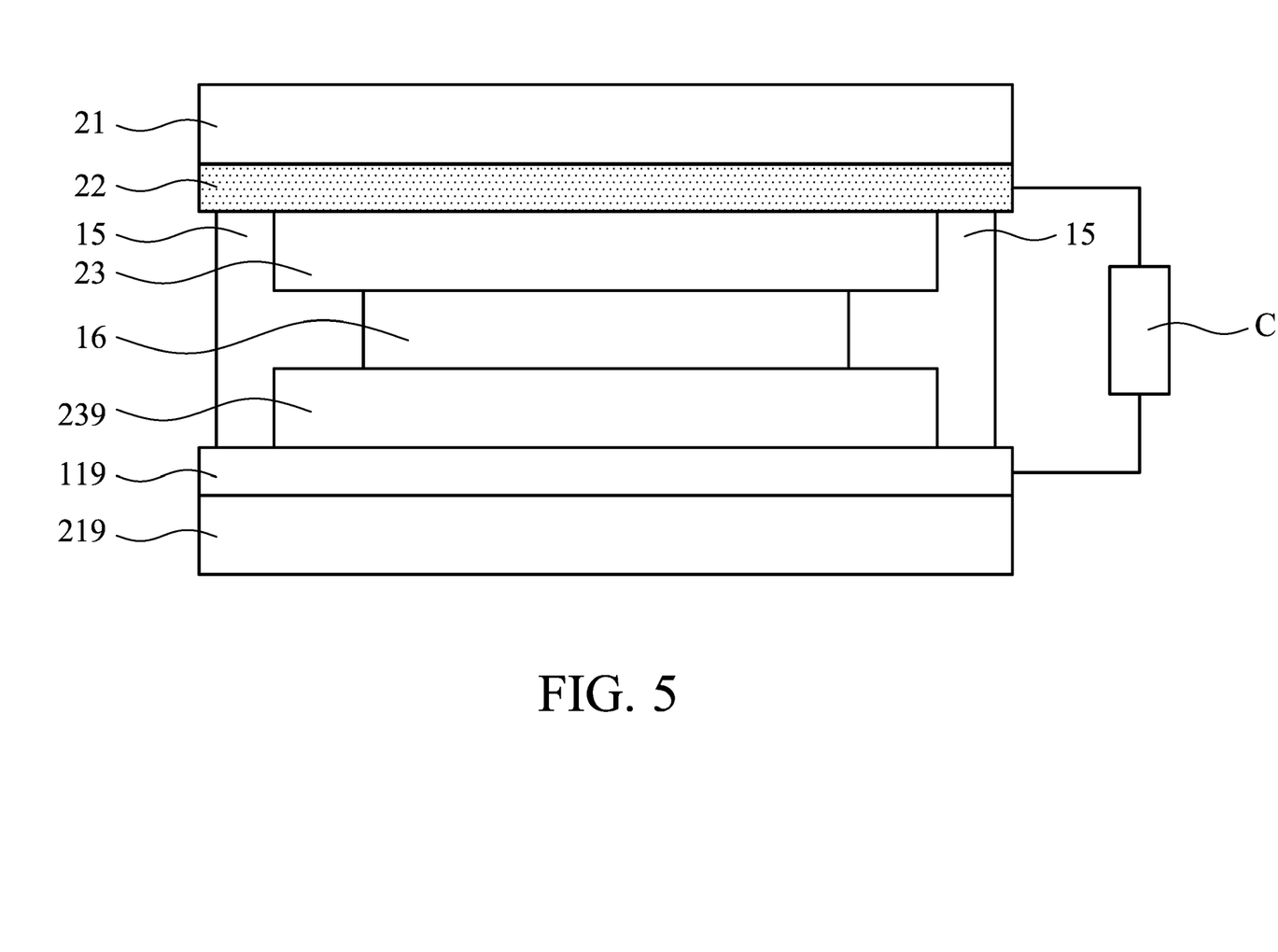
FIG. 5 is a perspective diagram of a pressure sensor according to a second embodiment of the invention.

FIG. 5 illustrates a second embodiment of a pressure sensor. Comparing FIG. 5 with FIG. 4, the electrode 11 is removed from the pressure sensor. In this configuration, the ballast resistive layer 22 acts as one of the electrodes and electrically connect to the control system C.

Figure 6:
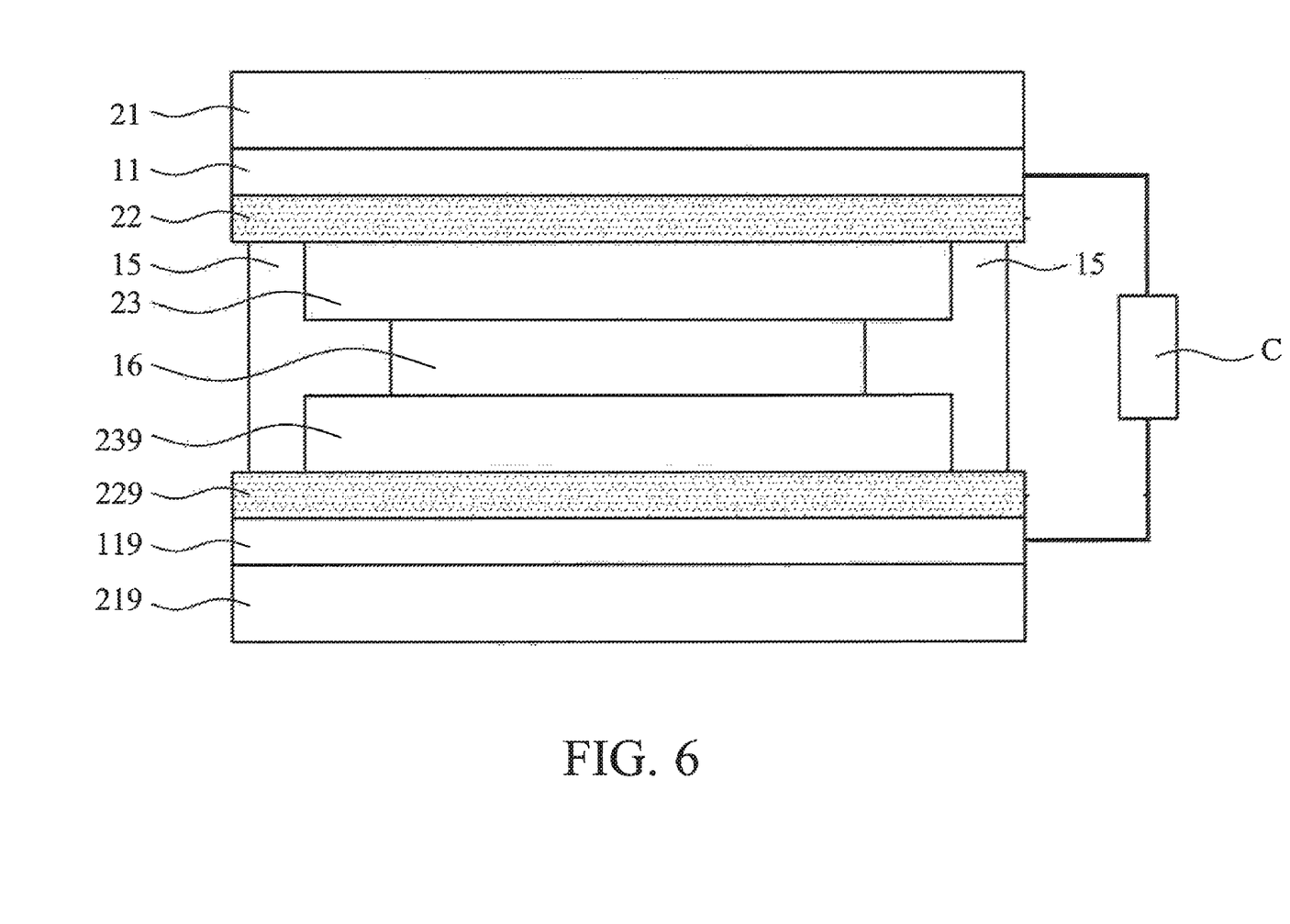
FIG. 6 is a perspective diagram of a pressure sensor according to a third embodiment of the invention.

FIG. 6 illustrates a third embodiment of a pressure sensor. Comparing FIG. 6 with FIG. 4, the pressure sensor in FIG. 6 comprises two ballast resistive layers 22 and 229 respectively connected to the electrodes 11 and 119. When the ballast resistive layers 22 and 229 have a high resistance, the two ballast resistive layers 22 and 229 and the metal electrodes 11 and 119 can uniformly disperse the current density.

Figure 7:
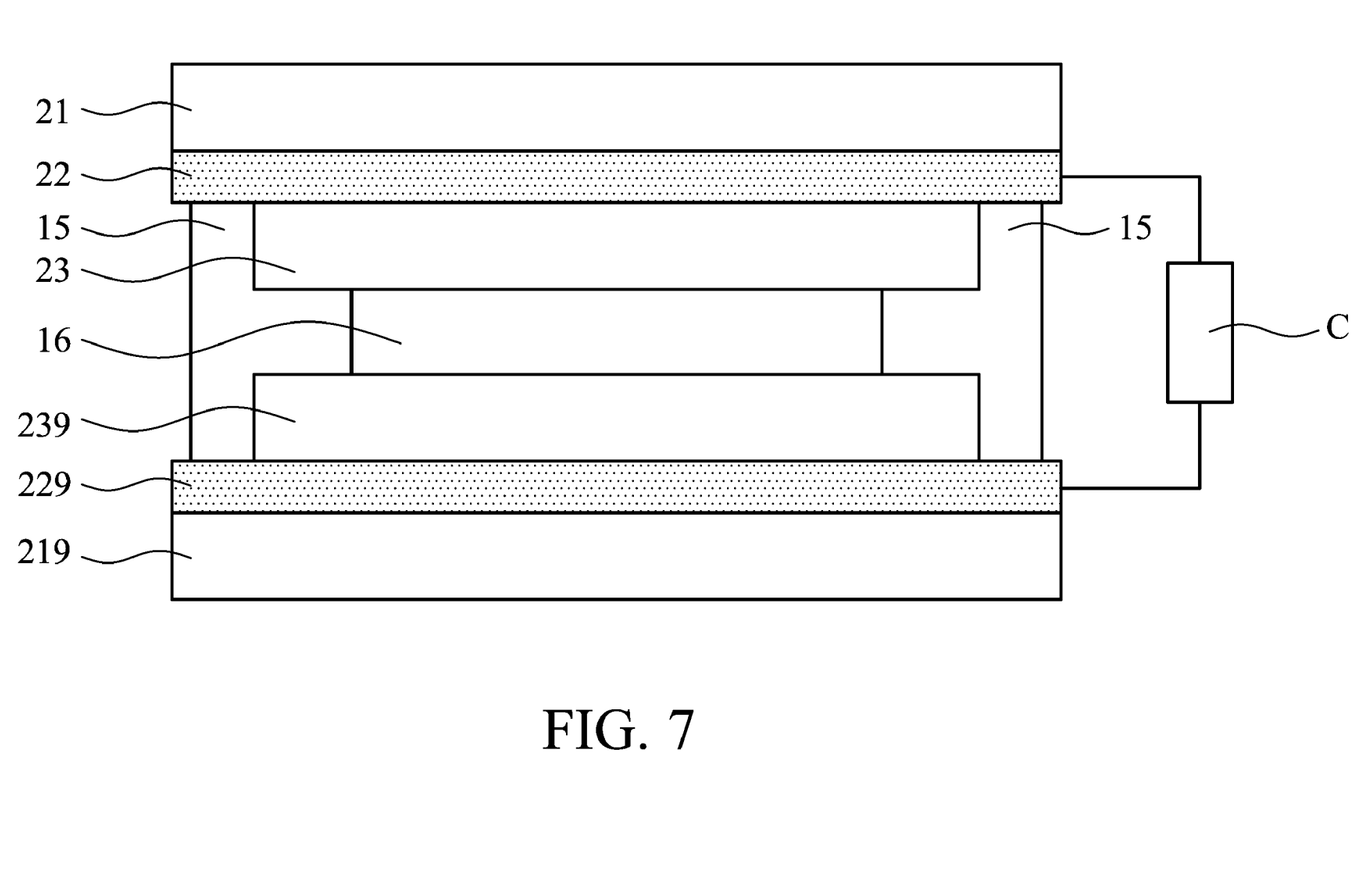
FIG. 7 is a perspective diagram of a pressure sensor according to a fourth embodiment of the invention.

FIG. 7 illustrates a fourth embodiment of a pressure sensor. Comparing FIG. 7 with FIG. 4, the electrodes 11 and 119 are removed from the pressure sensor. In this configuration, the upper ballast resistive layer 22 is electrically connected to the control system C. The lower ballast resistive layer 229 is also electrically connected to the control system C and disposed between the substrate 219 and the piezoresistive layer 239. In some embodiments, the ballast resistive layers 22 and 229 may comprise carbon paste, carbon/silver paste, metal oxide, nanoparticle, nanowire, nanosheet, nanorod, nanobelt, or carbon nanotube, wherein the resistivity of the ballast resistive layers 22 and 229 is between $10^{-4}$~$10^{10}$ $\Omega$-cm.

Figure 8:
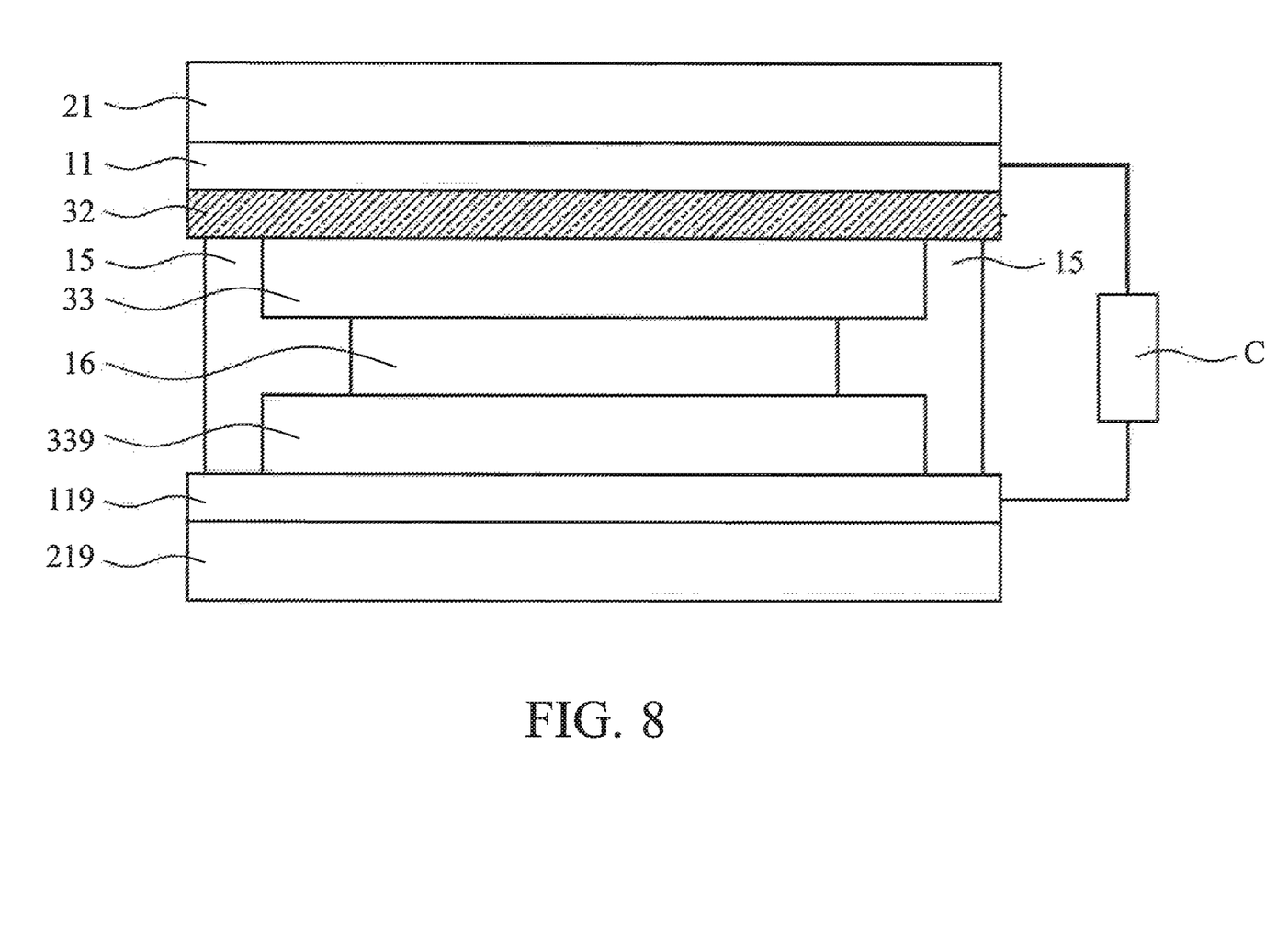
FIG. 8 is an embodiment of a pressure sensor based on the structure of FIG. 4.

FIG. 8 illustrates an embodiment of a pressure sensor based on the structure of FIG. 4, wherein the numeral 32 represents a ballast resistive layer of carbon paste which has a resistivity of $3.2*10^6$ $\Omega$-cm. In this embodiment, resistance of the piezoresistive layers 33 and 339 varies from $10^4\Omega$ to $10^2\Omega$ with the pressure increased. When no pressure is applied, the piezoresistive layers 33 and 339 respectively have a resistance of $10^4\Omega$. When an overload pressure is applied, the piezoresistive layers 33 and 339 respectively have a minimum resistance of $10^2\Omega$. The ballast resistive layer 32 has 10 um thickness and 1 cm$^2$ area, and resistance of the ballast resistive layer 32 is determined by the following formula:

$$R=(3.2*10^6 \text{ }\Omega\text{-cm}*10 \text{ }\mu\text{m})/1 \text{ cm}^2=3.2*10^3\Omega$$

Total series resistance of the pressure sensor can be calculated by summing the resistances of the ballast resistive layer 32 and the piezoresistive layers 33 and 339, wherein the resistance of the metal electrodes 11 and 119 can be ignored. The resistance of the space 16 is also ignored because the piezoresistive layers 33 and 339 contact each other and eliminate the space 16 when the pressure is applied to the pressure sensor.

In this embodiment, since the ballast resistive layer 32 of carbon paste has a fixed resistance $3.2*10^3\Omega$, and the piezoresistive layers 33 and 339 have a variable resistance, total series resistance of the pressure sensor exceeds $3.2*10^3\Omega$. Even if an overload pressure is applied to the pressure sensor, output resistance of the pressure sensor can be kept above $3.2*10^3\Omega$.

Figure 9:
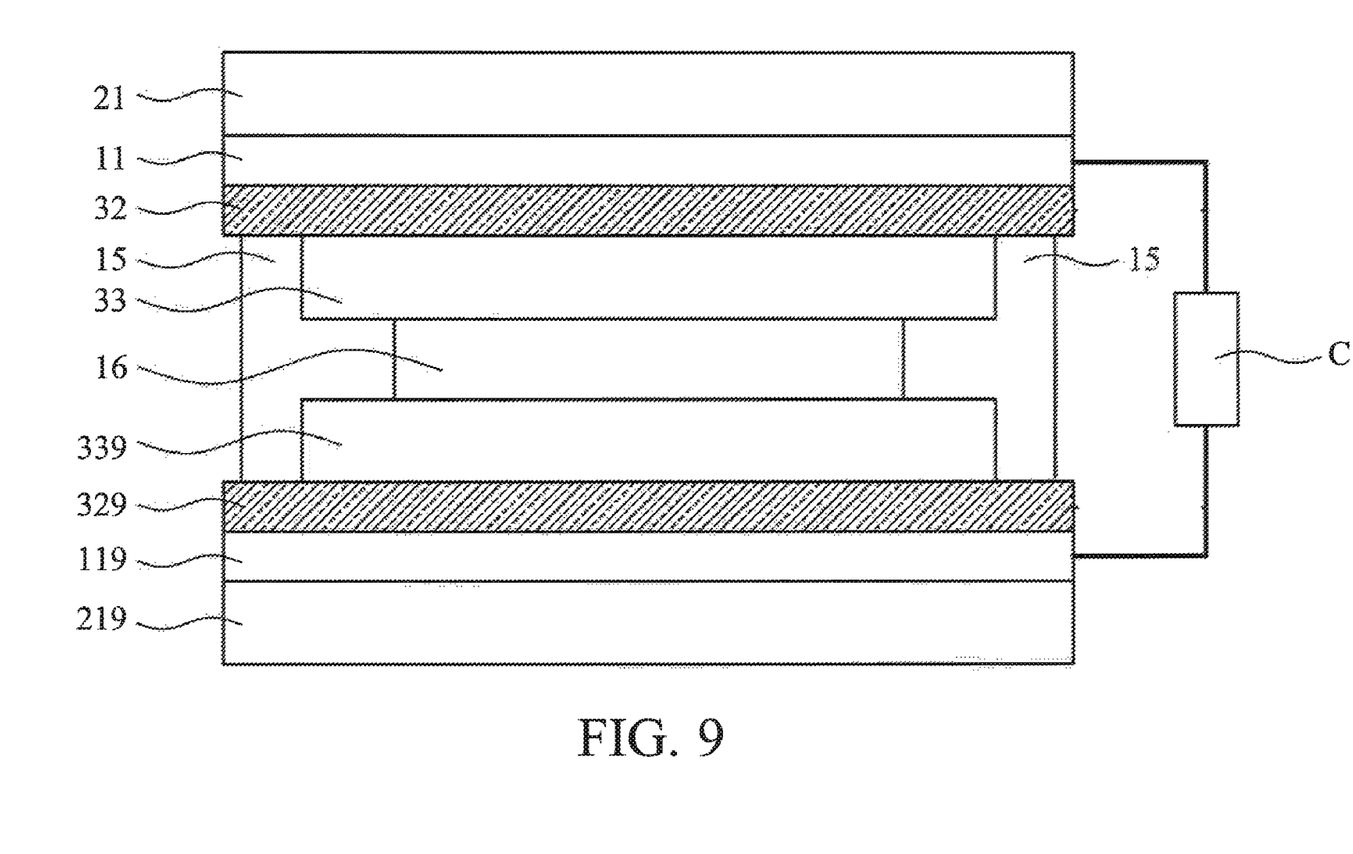
FIG. 9 is an embodiment of a pressure sensor based on the structure of FIG. 6.

FIG. 9 illustrates another embodiment of a pressure sensor based on the structure of FIG. 6, wherein the numerals 32 and 329 represent two ballast resistive layers of carbon paste which has a resistivity of $3.2*10^6$ $\Omega$-cm. In this embodiment, resistance of the piezoresistive layers 33 and 339 varies from $10^4\Omega$ to $10^2\Omega$ with the pressure increased. When no pressure is applied, the piezoresistive layers 33 and 339 respectively have a resistance of $10^4\Omega$. When an overload pressure is applied, the piezoresistive layers 33 and 339 respectively have a minimum resistance of $10^2\Omega$. Specifically, when the pressure is less than 6 KPa (pressure threshold), resistance of the piezoresistive layers 33 and 339 varies inversely with respect to the pressure, as the line A-B shown in FIG. 11. In this embodiment, the ballast resistive layer 32 has 10 um thickness and 1 cm$^2$ area, and resistance of the ballast resistive layers 32 and 329 is determined by the following formula:

$$R=(3.2*10^6 \text{ }\Omega\text{-cm}*10 \text{ }\mu\text{m})/1 \text{ cm}^2=3.2*10^3\Omega$$

Total series resistance of the pressure sensor can be calculated by summing the resistances of the ballast resistive layers 32, 329 and the piezoresistive layers 33 and 339. In this embodiment, each of the ballast resistive layers 32 and 329 has a resistance of $3.2*10^3\Omega$, and total resistance of the ballast resistive layers 32 and 329 is $6.4*10^3\Omega$. Hence, total series resistance of the pressure sensor definitely exceeds $6.4*10^3\Omega$. Even if an overload pressure is applied to the pressure sensor, output resistance of the pressure sensor can be maintained above $6.4*10^3\Omega$.

Figure 10:
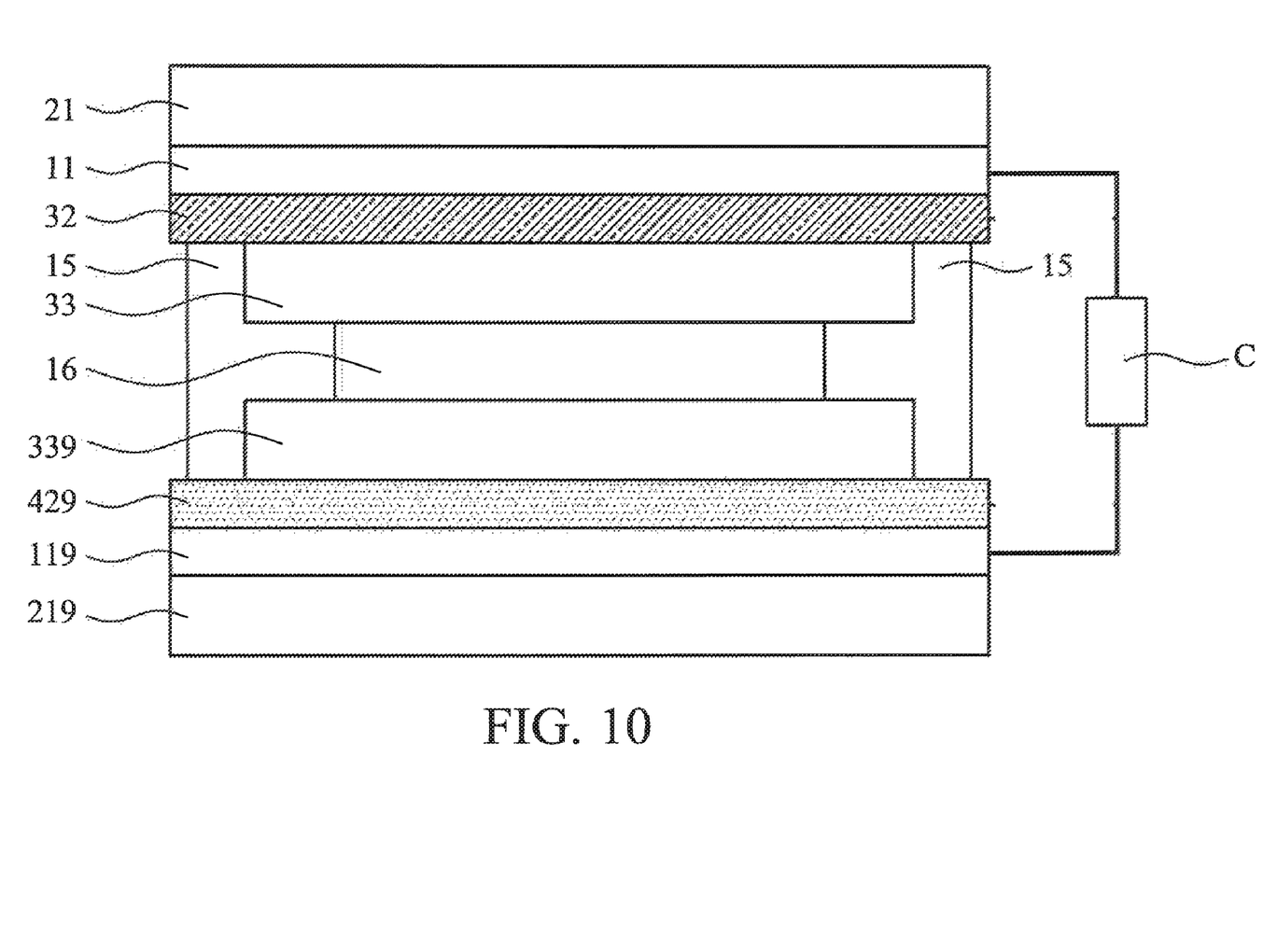
FIG. 10 is another embodiment of a pressure sensor based on the structure of FIG. 6.

FIG. 10 illustrates another embodiment of a pressure sensor based on the structure of FIG. 6, wherein the numeral 32 represents a ballast resistive layer of carbon paste which has a resistivity of $3.2*10^6$ $\Omega$-cm, and the numeral 429 represents a ballast resistive layer of silver paste which have a resistivity of $4.5*10^{-3}$ $\Omega$-cm. In this embodiment, resistance of the piezoresistive layers 33 and 339 varies from $10^4\Omega$ to $10^2\Omega$ with the pressure increased. When no pressure is applied, the piezoresistive layers 33 and 339 respectively have a resistance of $10^4\Omega$. When an overload pressure is applied, the piezoresistive layers 33 and 339 respectively have a minimum resistance of $10^2\Omega$. Specifically, when the pressure is less than 10 KPa (pressure threshold), resistance of the piezoresistive layers 33 and 339 is in linear relation to the pressure, as the line A-C shown in FIG. 11. In this embodiment, the ballast resistive layer 32 has 10 um thickness and 1 cm$^2$ area, and resistance of the ballast resistive layer 32 of carbon paste is determined by the following formula:

$$R=(3.2*10^6 \text{ }\Omega\text{-cm}*10 \text{ }\mu\text{m})/1 \text{ cm}^2=3.2*10^3\Omega$$

Similarly, the ballast resistive layer 429 of silver paste has 10 um thickness and 1 cm$^2$ area. Resistance of the ballast resistive layer 429 is determined by the following formula:

$$R=(4.5*10^{-3} \text{ }\Omega\text{-cm}*10 \text{ }\mu\text{m})/1 \text{ cm}^2=4.5*10^{-6}\Omega$$

Total series resistance of the pressure sensor can be calculated by summing the resistances of the ballast resistive layers 32, 429 and the piezoresistive layers 33 and 339. In this embodiment, the ballast resistive layer 32 has a resistance of $3.2*10^3\Omega$, and the ballast resistive layer 429 has a resistance of $4.5*10^{-6}\Omega$. Hence, total series resistance of the pressure sensor exceeds $3.2*10^3\Omega$. Even if an overload pressure is applied to the pressure sensor, output resistance of the pressure sensor can be maintained above $3.2*10^3\Omega$, as the line A-B shown in FIG. 11.

Figure 11:
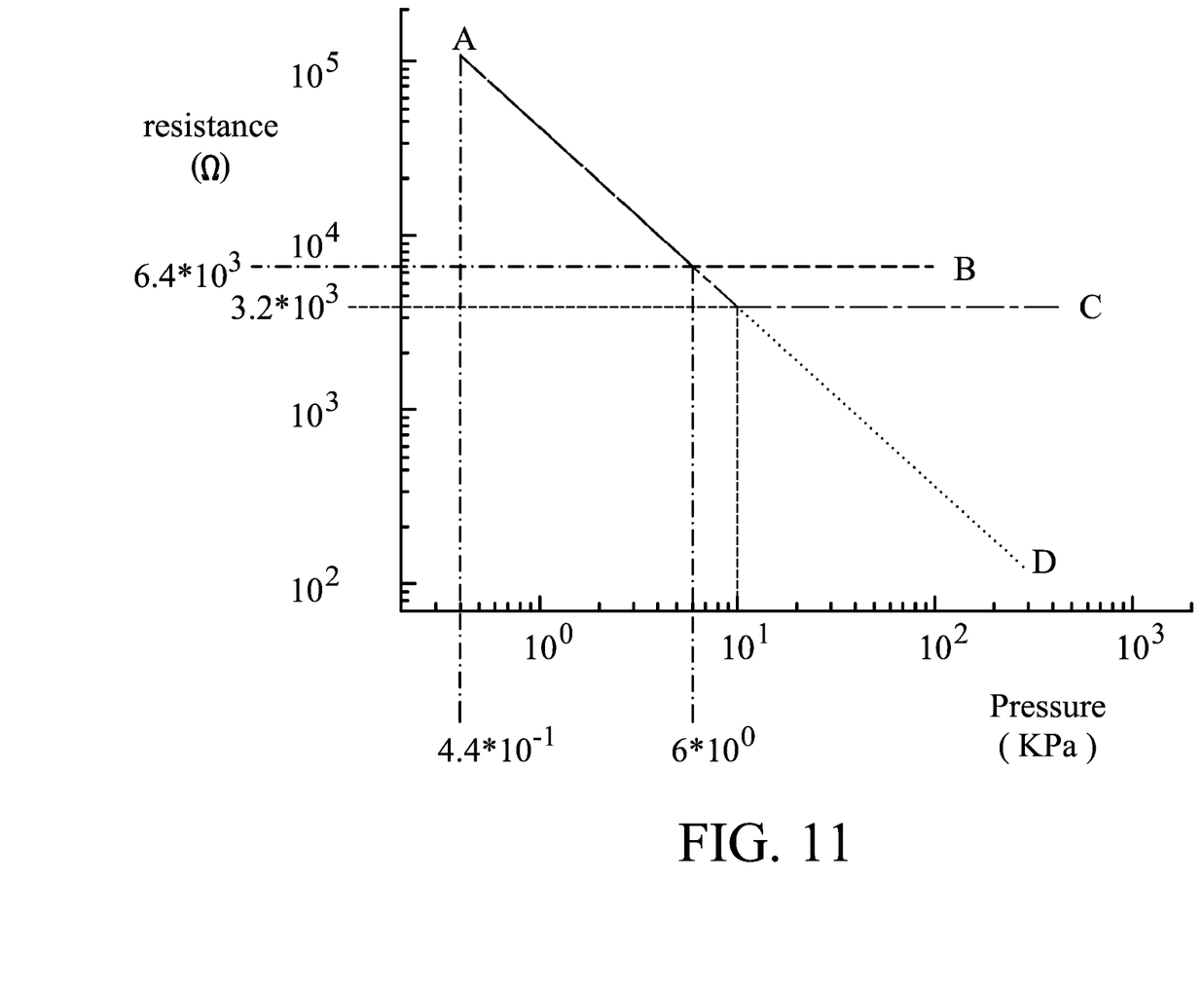
FIG. 11 illustrates a resistance-pressure diagram of the pressure sensor of the invention compared with the prior art.

Referring to FIG. 11, line A-D represents variable resistance of the piezoresistive layers 19 and 129 shown in FIG. 1, wherein the resistance is in linear relation to the pressure.

According to the line A-D in FIG. 11, the resistance is about $1.3*10^5 \Omega$ when the pressure is $4.4*10^{-1}$ KPa, and the resistance is about $1*10^2 \Omega$ when the pressure is $3*10^2$ KPa. The resistance always decreases with the increase of the pressure.

Comparing with the line A-D of the conventional pressure sensor, line A-C represents the output resistance of the pressure sensor in FIGS. 8 and 10. When the pressure is applied from $4.4*10^{-1}$ KPa–$1.1*10^0$ KPa, the output resistance linearly decreases with the increase of the pressure. When the pressure exceeds 10 KPa, the output resistance is maintained above $3.2*10^3 \Omega$.

Line A-B in FIG. 11 represents the output resistance of the pressure sensor in FIG. 9. When the pressure is applied from $4.4*10^{-1}$ KPa–$6*10^0$ KPa, the output resistance linearly decreases with the increase of the pressure. When the pressure exceeds 6 KPa, the output resistance is limited and saturated at a fixed value about $6.4*10^3 \Omega$.

Figure 12:
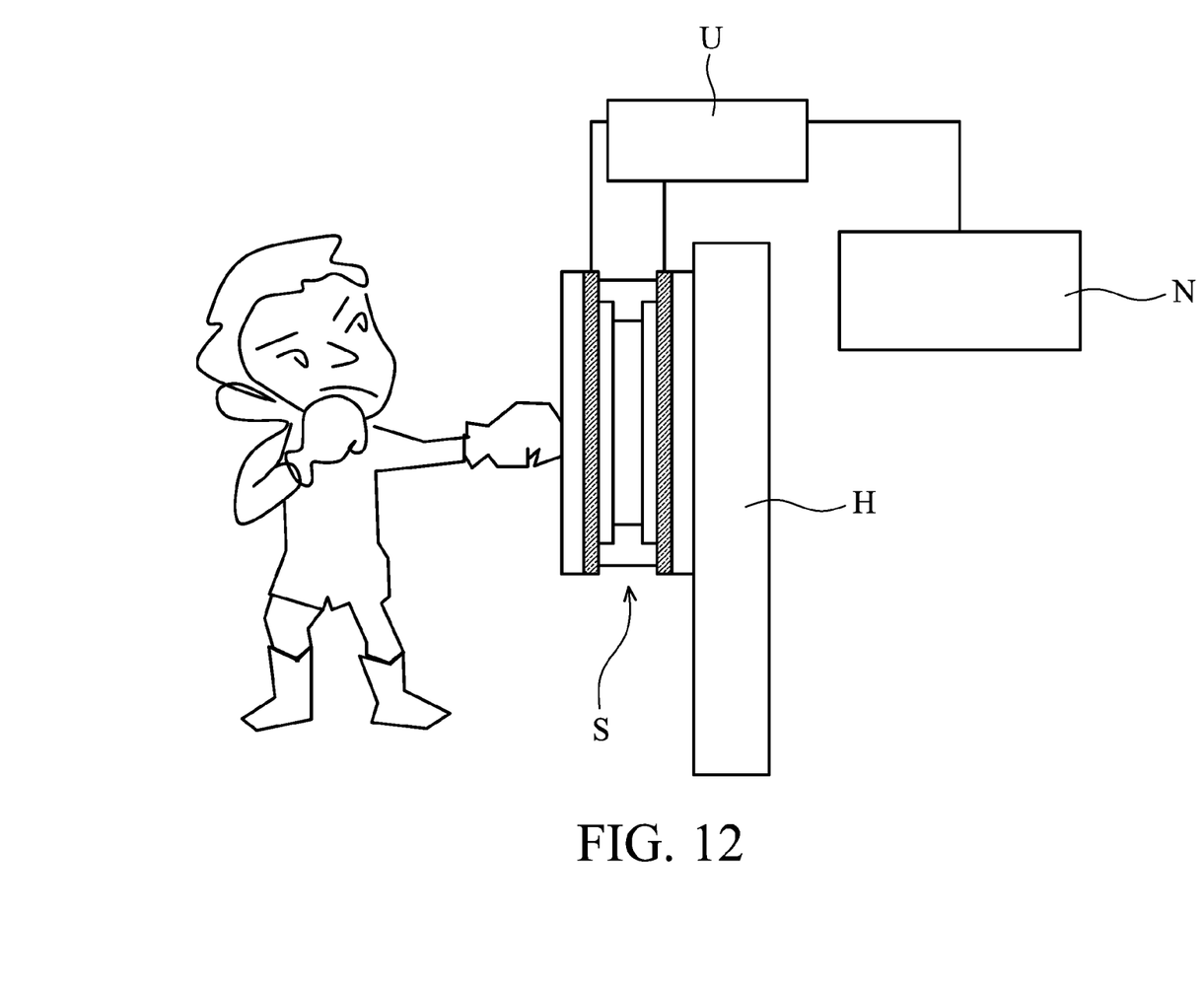
FIG. 12 is a perspective diagram of a boxing machine according to an embodiment of the invention.

Since the output resistance of the pressure sensor has a saturation characteristic, it can be used in a boxing machine to protect the system from excessive pressures. As shown in FIG. 12, the boxing machine includes boxing target of a pressure sensor S mounted on a holder H and electrically connected to a circuit unit U, wherein the circuit unit U connects to a screen N to show the pressure value. When an excessive force is exerted on the pressure sensor S, the output current can be limited to prevent the circuit unit U from failure or damage. According to FIG. 11, line A-B is suitable for a device applied in a pressure range of $4.4*10^{-1}$ KPa~$6*10^0$ KPa, and line A-B is suitable for a device applied in a pressure range of $4.4*10^{-1}$ KPa $10^1$ KPa.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A pressure sensor, comprising:
   a top stack, comprising:
      a top substrate;
      a top ballast resistive layer, configured under the top substrate; and
      a top piezoresistive layer, configured under the top ballast resistive layer; and
   a bottom stack, comprising:
      a bottom substrate;
      a bottom electrode layer, configured on top of the bottom substrate; and
      a bottom piezoresistive layer, configured on top of the bottom electrode layer;
   wherein the top stack and the bottom stack are spaced from each other.

2. The pressure sensor as claimed in claim 1, wherein the top ballast resistive layer has a resistivity of $10^{-4}$~$10^{10}\Omega$-cm.

3. The pressure sensor as claimed in claim 1, wherein the top ballast resistive layer is made of a material selected from the group consisting of carbon paste, carbon/silver paste, metal oxide, nanoparticle, nanowire, nanosheet, nanorod, nanobelt, and carbon or carbon nanotube.

4. The pressure sensor as claimed in claim 1, wherein the bottom electrode layer is a further ballast resistive layer made of a material selected from the group consisting of carbon paste, carbon/silver paste, metal oxide, nanoparticle, nanowire, nanosheet, nanorod, nanobelt, and carbon nanotube.

5. The pressure sensor as claimed in claim 1, wherein the top ballast resistive layer is a semiconductor.

6. The pressure sensor as claimed in claim 1, wherein the top ballast resistive layer is a semi-insulator.

7. The pressure sensor as claimed in claim 1, further comprising a circuit having two ends directly electrically coupled to the top ballast resistive layer and the bottom electrode layer, respectively.

8. A pressure sensor, comprising:
   a top electrode layer;
   a top piezoresistive layer under the top electrode layer and having a resistance variable depending on pressure applied to said top piezoresistive layer; and
   a bottom electrode layer;
   a bottom piezoresistive layer on top of the bottom electrode layer and having a resistance variable depending on pressure applied to said bottom piezoresistive layer;
   a circuit having two ends electrically coupled to the top and bottom electrode layers, respectively;
   a spacer between the top and bottom piezoresistive layers and defining a space between the top and bottom piezoresistive layers, said space being deformable under a pressure applied to said pressure sensor to cause the top and bottom piezoresistive layers to contact each other and create an electrical path through the circuit and the top and bottom electrode layers; and
   a ballast resistive layer positioned between the top piezoresistive layer and the top electrode layer and electrically coupled between the respective end of the circuit for maintaining a total resistance of the pressure sensor along said electrical path at least a predetermined value regardless of the resistance of the top and bottom piezoresistive layers.

9. The pressure sensor as claimed in claim 1, further comprising a bottom ballast resistive layer configured in between the bottom electrode layer and the bottom piezoresistive layer.

10. The pressure sensor as claimed in claim 1, further comprising a top metal electrode layer configured in between the top ballast resistive layer and the top substrate.

11. The pressure sensor as claimed in claim 9, wherein the bottom ballast resistive layer has a resistivity of $10^{-4}$~$10^{10}\Omega$-cm.

12. The pressure sensor as claimed in claim 9, wherein the bottom ballast resistive layer is made of a material selected from the group consisting of carbon paste, carbon/silver paste, metal oxide, nanoparticle, nanowire, nanosheet, nanorod, nanobelt, and carbon nanotube.

13. The pressure sensor as claimed in claim 1, further comprising:
   a spacer, disposed between the top and bottom piezoresistive layers to form a space between the top and bottom stacks.

14. The pressure sensor as claimed in claim 13, further comprises a bottom ballast resistive layer configured in between the bottom electrode and the piezoresistive layer.

15. The pressure sensor as claimed in claim 13, further comprises a top electrode layer configured in between the top ballast resistive layer and the top substrate.

16. The pressure sensor as claimed in claim 13, wherein the top ballast resistive layer has a resistivity of $10^{-4}$~$10^{10}\Omega$-cm.

17. The pressure sensor as claimed in claim 14, wherein the bottom ballast resistive layer has a resistivity of $10^{-4}$~$10^{10}\Omega$-cm.

18. The pressure sensor as claimed in claim 13, wherein the top ballast resistive layer is made of a material selected from the group consisting of carbon paste, carbon/silver paste, metal oxide, nanoparticle, nanowire, nanosheet, nanorod, nanobelt, and carbon nanotube.

19. The pressure sensor as claimed in claim 14, wherein the bottom ballast resistive layer is made of a material selected from the group consisting of carbon paste, carbon/silver paste, metal oxide, nanoparticle, nanowire, nanosheet, nanorod, nanobelt, and carbon nanotube.

20. A boxing machine, comprising:
 a boxing target, comprising the pressure sensor as claimed in claim 1 for punching; and
 a holder with the boxing target mounted thereon.

* * * * *